United States Patent
Manley et al.

(10) Patent No.: US 12,410,866 B2
(45) Date of Patent: *Sep. 9, 2025

(54) SEAL CARTRIDGE WITH ELECTRICALLY CONDUCTIVE NON-WOVEN GROUNDING

(71) Applicant: Freudenberg-NOK General Partnership, Plymouth, MI (US)

(72) Inventors: D. Anthony Manley, Cleveland, GA (US); Darin Battles, Dahlonega, GA (US); Christopher Beller, Cumming, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/330,434

(22) Filed: Jun. 7, 2023

(65) Prior Publication Data

US 2023/0313888 A1 Oct. 5, 2023

Related U.S. Application Data

(63) Continuation-in-part of application No. 17/514,986, filed on Oct. 29, 2021, now Pat. No. 11,754,188.

(51) Int. Cl.
*F16J 15/32* (2016.01)
*F16J 15/3232* (2016.01)
*F16J 15/3256* (2016.01)
*F16J 15/3284* (2016.01)

(52) U.S. Cl.
CPC ....... *F16J 15/3256* (2013.01); *F16J 15/3232* (2013.01); *F16J 15/3284* (2013.01)

(58) Field of Classification Search
CPC ... F16J 15/3256; F16J 15/3232; F16J 15/3284
See application file for complete search history.

(56) References Cited

U.S. PATENT DOCUMENTS

| 3,114,558 | A | 12/1963 | Rhoads et al. |
| 4,550,920 | A | 11/1985 | Matsushima |
| 5,292,199 | A | 3/1994 | Hosbach et al. |

(Continued)

FOREIGN PATENT DOCUMENTS

| CA | 2893739 A1 * | 11/2016 | ............... F16J 15/34 |
| CN | 111043315 A | 4/2020 | |

(Continued)

*Primary Examiner* — Vishal A Patel
(74) *Attorney, Agent, or Firm* — Daniel J. Sepanik, Esq.; Harness, Dickey & Pierce, P.L.C.

(57) ABSTRACT

A cassette seal arrangement for sealing between a shaft and a housing includes a sleeve configured to be mounted to the shaft and including a cylindrical portion and a radially extending portion extending radially outward from the cylindrical portion. A retainer cartridge includes a main retainer configured to be mounted to the housing and supporting a seal member that includes a main seal lip and an exclusionary retainer connected to the main retainer and supporting an exclusionary seal configured to engage the shaft. An electrically conductive non-woven element is disposed longitudinally between the seal member and the exclusionary seal and engages the retainer cartridge and is configured to engage the shaft.

1 Claim, 4 Drawing Sheets

(56) References Cited

U.S. PATENT DOCUMENTS

| | | | |
|---|---|---|---|
| 6,315,296 B1 * | 11/2001 | Oldenburg | F16J 15/3256 |
| | | | 277/572 |
| 6,692,007 B2 | 2/2004 | Oldenburg | |
| 7,658,386 B2 * | 2/2010 | Oldenburg | F16J 15/3256 |
| | | | 277/572 |
| 10,190,690 B2 | 1/2019 | Colineau et al. | |
| 10,240,677 B2 * | 3/2019 | Angiulli | F16J 15/3268 |
| 2006/0290070 A1 * | 12/2006 | Park | F16J 15/3244 |
| | | | 277/559 |
| 2014/0203514 A1 * | 7/2014 | Colineau | F16J 15/3232 |
| | | | 277/549 |
| 2022/0099187 A1 * | 3/2022 | Sitko | F16C 33/7883 |

FOREIGN PATENT DOCUMENTS

| | | | | |
|---|---|---|---|---|
| DE | 102016217872 A1 * | 4/2017 | | F16C 19/52 |
| DE | 102018104754 A1 * | 9/2019 | | F16J 15/3284 |
| DE | 102021102570 A1 | 8/2022 | | |
| JP | 2007247708 A | 9/2007 | | |

\* cited by examiner

SEAL CARTRIDGE WITH ELECTRICALLY CONDUCTIVE NON-WOVEN GROUNDING

CROSS-REFERENCE TO RELATED APPLICATIONS

This application is a continuation-in-part of U.S. patent application Ser. No. 17/514,986, filed on Oct. 29, 2021. The entire disclosure of the above application is incorporated herein by reference.

FIELD

The present disclosure relates to a seal cartridge with an electrically conductive non-woven element.

BACKGROUND

This section provides background information related to the present disclosure which is not necessarily prior art.

Conventional cassette seals are designed to allow high contamination exclusion by multiple exclusion features.

Current electrically conducting seal arrangements, such as disclosed in U.S. Pat. No. 10,190,690, make a low impedance connection (grounding) between the shaft and housing in order to eliminate electrical interference.

SUMMARY

This section provides a general summary of the disclosure, and is not a comprehensive disclosure of its full scope or all of its features.

A cassette seal arrangement for sealing between a shaft and a housing includes a sleeve configured to be mounted to the shaft and including a cylindrical portion and a radially extending portion extending radially outward from the cylindrical portion. A retainer cartridge includes a main retainer configured to be mounted to the housing and supporting a seal member that includes a main seal lip and an exclusionary retainer connected to the main retainer and supporting an exclusionary seal configured to engage the shaft. An electrically conductive non-woven element is disposed longitudinally between the seal member and the exclusionary seal and engages the retainer cartridge and is configured to engage the shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
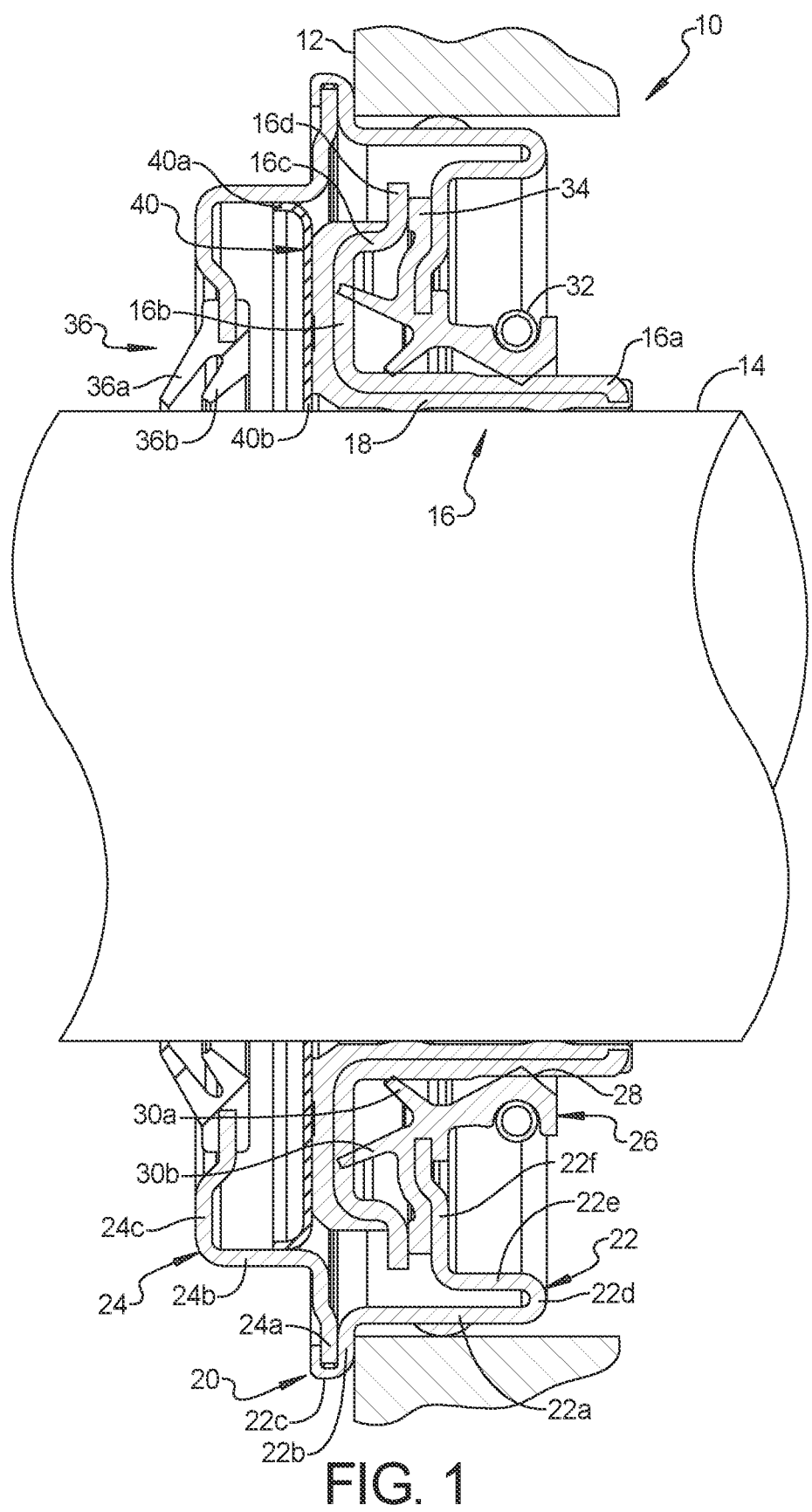
FIG. 1 is a cross-sectional view of an exemplary cassette seal arrangement according to a first embodiment.

With reference to FIG. 1, an exemplary cassette seal arrangement 10 according to the principles of the present disclosure will now be described. The cassette seal arrangement 10 is configured to be mounted between a housing 12 and a shaft 14 for sealing a gap therebetween.

The cassette seal arrangement 10 includes a sleeve 16 configured to be mounted to the shaft 14 and including a first cylindrical portion 16a that receives the shaft 14 therein and a first radially extending portion 16b extending radially outward from the cylindrical portion 16a. A second cylindrical portion 16c extends axially from an outer end of the radially extending portion 16b and a second radially extending portion 16d extending from an end of the second cylindrical portion 16c. The sleeve 16 can further include an elastomeric layer 18 on an inner surface of the cylindrical portion 16a and on an outboard side of the first radially extending portion 16b and the second cylindrical portion 16c of the sleeve 16.

A retainer cartridge 20 is configured to be mounted to the housing 12 and includes a main retainer 22 and an exclusionary retainer 24 connected to one another. The main retainer 22 supports a seal member 26 that includes a main seal lip 28 and a pair of dust lips 30a, 30b. The main retainer 22 includes a cylindrical outer portion 22a that engages the housing 12 and a radially outwardly bent region 22b that extends from a first end of the cylindrical outer portion 22a and that defines a shoulder that abuts against the housing. The radially outwardly bent region 22b terminates in a U-shaped bend 22c that captures an outer end 24a of the exclusionary retainer 24. The main retainer 22 includes a first radially inwardly extending portion 22d extending inwardly from a second end of the cylindrical outer portion 22a. An inner cylindrical portion 22e extends axially from a radial inner end of the first radially inwardly extending portion 22d. A second radially inwardly extending portion 22f extends radially inward from a second end of the inner cylindrical portion 22e. The seal member 26 is molded on an inner end of the second radially inwardly extending portion 22f. The main seal lip 28 and a first of the pair of dust lips 30a engage the cylindrical portion 16a of the sleeve 16 while a second dust lip 30b of the pair of dust lips engage the first radially extending portion 16b of the sleeve 16. The main seal lip 28 can include a garter spring 32. The elastomer molded on the second radially inwardly extending portion 22f further includes a bumper region opposing the second radially extending portion 16d of the sleeve 16.

The outer end 24a of the exclusionary retainer 24 is connected to the U-shaped bend 22c of the main retainer 22. The exclusionary retainer 24 further includes a cylindrical portion 24b extending axially from the outer end 24a in a direction opposite to the main retainer 22. A radially inwardly extending portion 24c extending radially inwardly from the cylindrical portion 24b and supporting an exclusionary seal 36. The exclusionary seal 36 is configured to engage the shaft and can include a pair of dust lips 36a, 36b.

Figure 3:
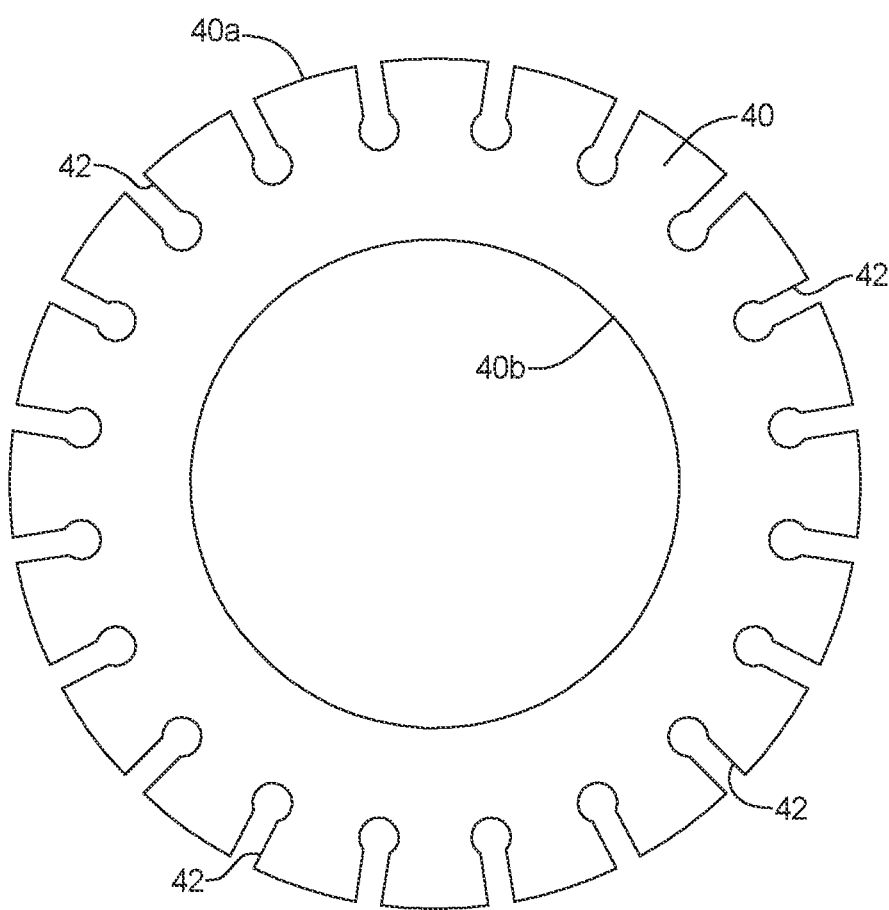
FIG. 3 is a plan view of an exemplary electrically conductive non-woven element.

An electrically conductive non-woven element 40 is disposed longitudinally between the seal member 26 and the exclusionary seal 36. The electrically conductive non-woven element 40 has an outer perimeter 40a that engages the retainer cartridge 24 and an inner perimeter 40b configured to engage the shaft 14. The electrically conductive non-woven element 40 can be adhered to an outboard face of the first radially extending portion 16b of the sleeve 16. As shown in FIG. 3, the electrically conductive non-woven element 40 can further include keyhole slots 42 extending radially inward from the outer perimeter 40a. The keyholes 42 reduce the radial load of the nonwoven element 40 and reduce the torque required to rotate the shaft 14 and sleeve 16 when in contact with the exclusion/retainer seal.

Figure 2:
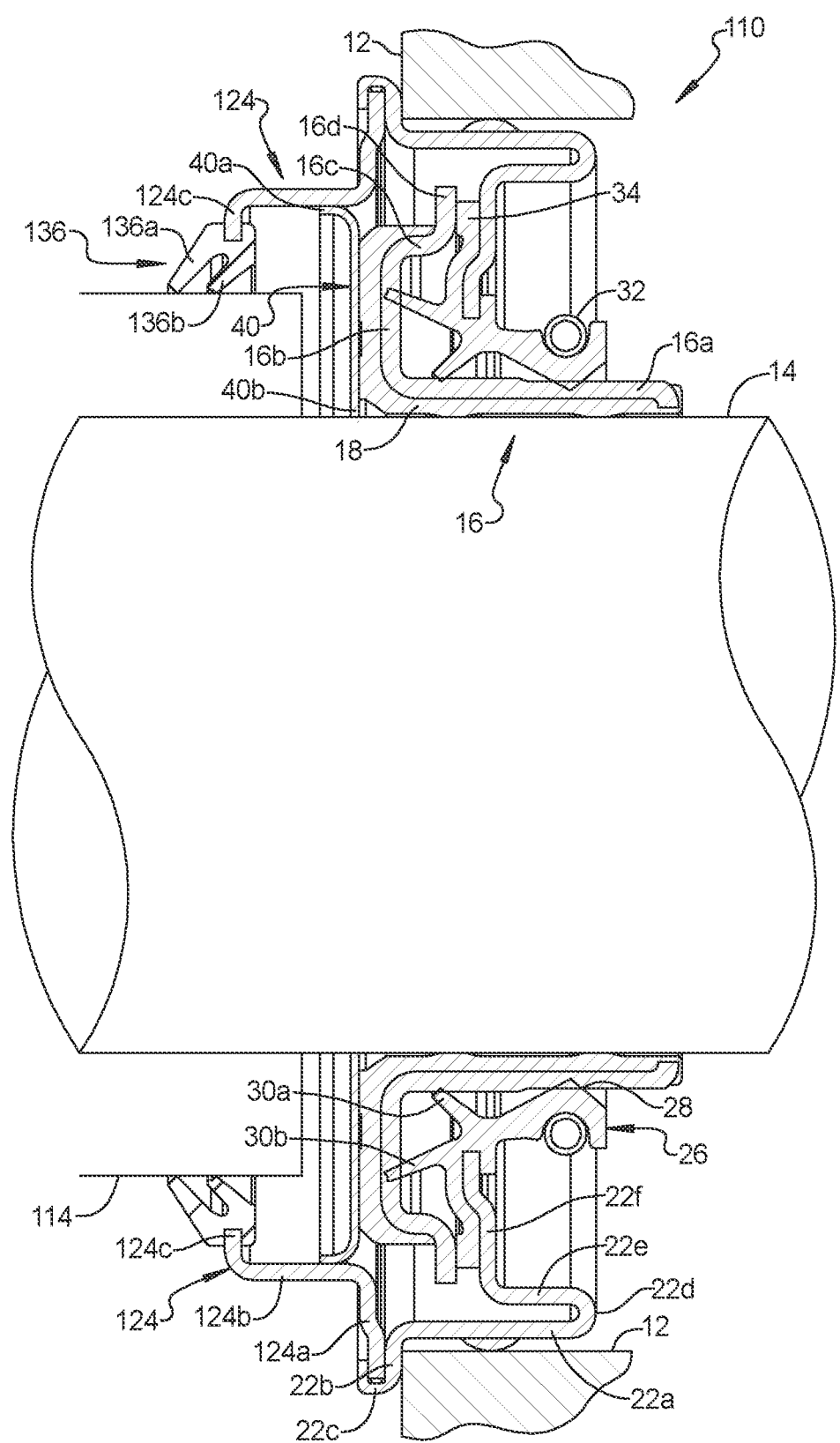
FIG. 2 is a cross-sectional view of an exemplary cassette seal arrangement according to an alternative second embodiment.

With reference to FIG. 2 wherein like reference numerals are used to indicate the same or similar elements, an alternative cassette seal arrangement 110 is shown including a modified exclusionary retainer 124 for supporting the exclusionary seal 136 in engagement with an auxiliary sleeve 114 disposed on the shaft 14. The modified exclusionary retainer 124 has a shorter radially inwardly extending portion 124c than the exclusionary retainer 24.

Figure 4:
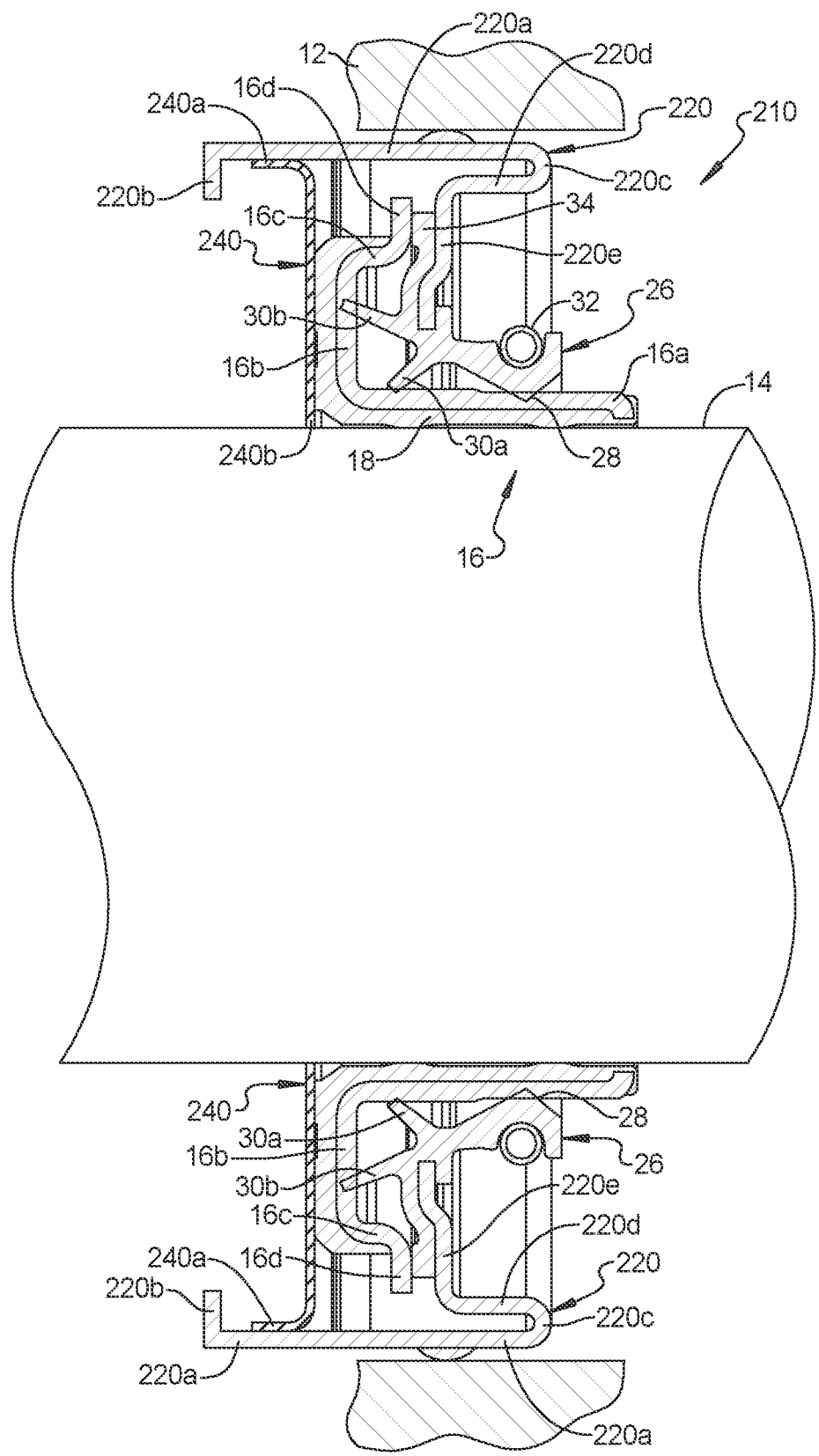
FIG. 4 is a cross-sectional view of an exemplary cassette seal arrangement according to a third embodiment.

With reference to FIG. 4 wherein like reference numerals are used to indicate the same or similar elements, an exemplary cassette seal arrangement 210 according to the principles of the present disclosure will now be described. The cassette seal arrangement 210 is configured to be mounted between a housing 12 and a shaft 14 for sealing a gap therebetween.

The cassette seal arrangement 210 includes a sleeve 16 configured to be mounted to the shaft 14 and including a first cylindrical portion 16a that receives the shaft 14 therein and a first radially extending portion 16b extending radially outward from the cylindrical portion 16a. A second cylindrical portion 16c extends axially from an outer end of the radially extending portion 16b and a second radially extending portion 16d extending from an end of the second cylindrical portion 16c. The sleeve 16 can further include an elastomeric layer 18 on an inner surface of the cylindrical portion 16a and on an outboard side of the first radially extending portion 16b and the second cylindrical portion 16c of the sleeve 16.

A retainer 220 is configured to be mounted to the housing 12. The retainer 220 supports a seal member 26 that includes a main seal lip 28 and a pair of dust lips 30a, 30b. The retainer 220 includes a cylindrical outer portion 220a that engages the housing 12 and a radially inwardly bent region 220b that extends from a first end of the cylindrical outer portion 220a. The retainer 220 includes a first radially inwardly extending portion 220c extending inwardly from a second end of the cylindrical outer portion 220a. An inner cylindrical portion 220d extends axially from a radial inner end of the first radially inwardly extending portion 220c. A second radially inwardly extending portion 220e extends radially inward from a second end of the inner cylindrical portion 220d. The seal member 26 is molded on an inner end of the second radially inwardly extending portion 220e. The main seal lip 28 and a first of the pair of dust lips 30a engage the cylindrical portion 16a of the sleeve 16 while a second dust lip 30b of the pair of dust lips engage the first radially extending portion 16b of the sleeve 16. The main seal lip 28 can include a garter spring 32. The elastomer molded on the second radially inwardly extending portion 220e further includes a bumper region 34 opposing the second radially extending portion 16d of the sleeve 16.

An electrically conductive non-woven element 240 has a radially outer end 240a engaging the cylindrical outer portion 220a of the retainer 220 and a radially inner end 240b engaging the shaft 14. The electrically conductive non-woven element 240 can be adhered to an outboard face of the first radially extending portion 16b of the sleeve 16. As noted with respect to FIG. 3, the electrically conductive non-woven element 240 can further include keyhole slots 42 extending radially inward from the outer perimeter 40a.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cassette seal arrangement sealing between a shaft and a housing, comprising:
- a sleeve mounted on the shaft and including a cylindrical portion and a radially extending portion extending radially outward from the cylindrical portion;
- a retainer cartridge including a main retainer mounted directly to and makes electrically conductive contact with the housing and the main retainer directly supporting a seal member that includes a main seal lip that contacts the cylindrical portion of the sleeve and an exclusionary retainer formed separate from the main retainer and connected to the main retainer and supporting an exclusionary seal that engages the shaft, wherein the radially extending portion of the sleeve is disposed longitudinally between the seal member and the exclusionary seal;
- an electrically conductive non-woven element mounted to the radially extending portion of the sleeve and disposed longitudinally between the radially extending portion of the sleeve and the exclusionary seal and having an outer perimeter engaging a cylindrical portion of the exclusionary retainer of the retainer cartridge and an inner perimeter that directly engages the shaft, wherein the electrically conductive non-woven element includes a plurality of slots extending radially inward from an outer perimeter.

* * * * *